(12) United States Patent
Hesse et al.

(10) Patent No.: US 7,524,444 B2
(45) Date of Patent: Apr. 28, 2009

(54) SHAPED BODIES CONTAINING METAL-ORGANIC FRAMEWORKS

(75) Inventors: Michael Hesse, Worms (DE); Ulrich Mueller, Neustadt (DE); Omar Yaghi, Los Angeles, CA (US)

(73) Assignees: BASF Aktiengesellschaft, Ludwigshafen (DE); The Regents of the University of Michigan, Ann Arbor, MI (US)

( * ) Notice: Subject to any disclaimer, the term of this patent is extended or adjusted under 35 U.S.C. 154(b) by 809 days.

(21) Appl. No.: 10/983,629

(22) Filed: Nov. 9, 2004

(65) Prior Publication Data

US 2006/0099398 A1    May 11, 2006

(51) Int. Cl.
*B29C 43/02* (2006.01)
(52) U.S. Cl. .................................. 264/109; 264/125
(58) Field of Classification Search ................ None
See application file for complete search history.

(56) References Cited

U.S. PATENT DOCUMENTS

| | | | |
|---|---|---|---|
| 5,648,508 A | 7/1997 | Yaghi | |
| 6,617,467 B1 | 9/2003 | Mueller et al. | |
| 6,624,318 B1 | 9/2003 | Mueller et al. | |
| 6,893,564 B2 * | 5/2005 | Mueller et al. | 210/502.1 |
| 7,202,385 B2 * | 4/2007 | Mueller et al. | 568/679 |
| 7,309,380 B2 * | 12/2007 | Muller et al. | 95/141 |
| 2003/0078311 A1 | 4/2003 | Mueller et al. | |
| 2003/0148165 A1 | 8/2003 | Mueller et al. | |
| 2003/0222023 A1 | 12/2003 | Mueller et al. | |
| 2004/0081611 A1 | 4/2004 | Mueller et al. | |
| 2004/0097724 A1 | 5/2004 | Mueller et al. | |
| 2004/0265670 A1 | 12/2004 | Mueller et al. | |
| 2005/0154222 A1 * | 7/2005 | Muller et al. | 556/118 |

FOREIGN PATENT DOCUMENTS

| | | |
|---|---|---|
| EP | 0 709 253 A1 | 5/1996 |
| WO | WO 03/102000 A1 | 12/2003 |
| WO | WO 2005/068474 A1 | 7/2005 |

OTHER PUBLICATIONS

G. Ertl, et al., "Preparation of Solid Catalysts", Wiley-VCH, 1999, 6 pages.
M. O'Keeffe, et al., "Frameworks for Extended Solids: Geometrical Design Principles", Journal of Solid State Chemistry, 152, 2000, pp. 3-20.
Hailian Li, et al., "Design and synthesis of an exceptionally stable and highly porous metal-organic framework", Nature, vol. 402, Nov. 18, 1999, pp. 276-279.
Mohamed Eddaoudi, et al., "Design and synthesis of metal-carboxylate frameworks with permanent microporosity", Topics in Catalysis 9, 1999, pp. 105-111.
Banglin Chen, et al., "Interwoven Metal-Organic Framework on a Periodic Minimal Surface with Extra-Large Pores", Science, vol. 291, Feb. 9, 2001, pp. 1021-1023.
U.S. Appl. No. 10/983,629, filed Nov. 9, 2004, Hesse et al.
U.S. Appl. No. 10/270,642, filed Oct. 16, 2002, Mueller et al.
U.S. Appl. No. 10/580,407, filed May 24, 2006, Mueller et al.

* cited by examiner

*Primary Examiner*—Mary Lynn F Theisen
(74) *Attorney, Agent, or Firm*—Oblon, Spivak, McClelland, Maier & Neustadt, P.C.

(57) ABSTRACT

The present invention relates to shaped bodies containing a metal-organic framework material (MOF) as well as a process for the preparation thereof and their use especially as catalyst or storage medium.

14 Claims, No Drawings

SHAPED BODIES CONTAINING METAL-ORGANIC FRAMEWORKS

The present invention relates to shaped bodies containing a metal-organic framework material (MOF) as well as a process for the preparation thereof and their use especially as catalyst or storage medium.

Materials displaying a large internal surface area, often resulted from a multitude of pores or channels, are of predominant interest for applications in catalysis, for absorption and/or adsorption techniques, ion exchanging, chromatography, storage and/or uptake of substances, among others. The preparation of solid porous materials according to the present state of the art is described, for example, in *Preparation of Solid Catalysts*, Gerhard Ertl, Helmut Knözinger, Jens Weitkamp (Eds.), Wiley VCH, Weinheim, 1999. Here, solid porous materials are prepared by precipitation, sol-gel processes, spray-drying, foaming etc.

In a promising novel and alternative synthesis strategy to create micro- and/or mesoporous active materials, metal ions and molecular organic building blocks are used to form so-called metal-organic frameworks. The metal-organic framework materials (MOFs) as such are described, for example, in U.S. Pat. No. 5,648,508, EP-A-0 709 253, M. O'Keeffe et al., *J. Sol. State Chem.*, 152 (2000) p. 3-20, H. Li et al., *Nature* 402 (1999) p. 276 seq., M. Eddaoudi et al., *Topics in Catalysis* 9 (1999) p. 105-111, B. Chen et al., *Science* 291 (2001) p. 1021-23. Among the advantages of these novel materials, in particular for applications in catalysis, are the following: (i) larger pore sizes can be realized than for the zeolites used presently (ii) the internal surface area is larger than for porous materials used presently (iii) pore size and/or channel structure can be tailored over a large range, (iv) the organic framework components forming the internal surface can be functionalized easily.

However these novel porous materials as such, based on metal-organic frameworks, are generally obtained as small crystallites or powders and—in this form—cannot be put to use in most applications. Therefore, the MOF materials had to be worked out into forms allowing a broad use in those applications.

WO-A-03/102000 describes in general terms the conversion of MOF containing powder into shaped bodies like pellets with a crush strength in the range of 2 to 100 N. In an example pellets are made by means of an eccentric press, which have a crush strength of 10 N.

Such a conversion by pressing a powder into the desired shape results in a compression of the MOF containing material so that the density of that material is increased. This results in a decrease of the surface area of such a shaped material in comparison to the powder. As the abovementioned advantageous effects of MOF containing material are closely linked to the surface area of the material, a surface decrease in MOF containing material is undesirable with regard to their adsorption, storage and other properties. On the other hand the shaped materials are easier to handle.

For MOF containing materials, the decrease of the surface area, e.g. by pressing, during the shape forming step is not only due to a physical reduction of the outer surface, but is also caused by the destruction of spacial structures within the metal-organic framework. This may be explained by the high pore volume resulting in a high fragility of the organic framework structure in comparison to others, like those architectures formed by zeolites.

Another important factor is the stability or hardness of a shaped body. Normally the stability correlates with the pressure used to from the shaped body. The hardness of the body is closely associated with its stability. Here, the same phenomenon can be observed. On one hand a stable shaped body is desired on the other hand the necessary compression to obtain the shaped body decreases the active surface as described above.

Thus, one object of the present invention is to provide a process for the preparation of a shaped body containing a MOF where the unfavorable reduction of the surface area of the shaped body compared to that of the powder is at least minimized.

Surprisingly, it is found that even though the surface area of a shaped body with a certain weight is lower than that of a respective amount of powder the situation is completely converted in a situation where surface areas are compared at a predetermined volume. The predominating effect of destroying 3-dimensional structures during the conversion of the powder into a shaped body is surprisingly "delayed" in such a way that firstly the ratio surface area per volume of the shaped body containing a MOF to that of the respective powder increases before the 3-D destroying effect resulting from the shape forming step prevails and the abovementioned ratio decreases in the expected manner.

As a consequence, shaped bodies can be prepared according to the present invention by a process comprising the step of converting a MOF containing powder into the shaped body, wherein the ratio of the surface area per volume of the shaped body to the surface area per volume of the powder is greater than 1,6.

Shaped bodies prepared according to the process of the present invention are more effective for applications, where the surface area is of importance because of their optimized ratio mentioned above. For most of these applications the maximum volume is predetermined by the surrounding for the MOF containing shaped bodies, e.g. the volume of a reaction vessel for catalytic reactions or a separation column for chromatography or a tank for storage purposes. Therefore, the aim to optimize the surface area for a predetermined volume is of importance.

Ratios can be determined by converting MOF containing powder in shaped bodies varying the respective conditions and measuring the surface areas of the shaped body and the powder. The optimized range may be determined by interpolation of the measuring points. A preferred condition to be varied is the pressure under which the shaped body is molded.

It is found, that the abovementioned positive effect may apply for shaped bodies containing MOF where the ratio of the surface area per volume of the shaped body to the surface area per volume of the powder is at least 1,6:1.

Preferably, a process is used where the ratio of the surface area per volume of the shaped body to the surface area per volume of the powder is at least 1,7:1, more preferred at least 1,8:1. The maximum ratio may be 5:1, at least 2,5:1.

The surface area may be determined by using the so called BET method ("BET surface area"). This refers to the Brunauer, Emmett and Teller (BET) method for surface area determination, which utilizes the isothermal adsorption of nitrogen to measure total surface area of a material. Another method uses the Langmuir model. The measurements can be carried out according to DIN 66131 and/or DIN 66134. Preferably, the BET method is used.

The result of the abovementioned surface area measurements are usually expressed by a surface area per weight, e.g. $m^2/g$. The multiplication with a density value results in the desired surface area per volume, e.g. $m^2/l$.

For the powder the used density determination is preferably based on the measurement of its weight per liter (also called liter weight or bulk density). Here, a container of a known volume is filled with the powder and the weight of the powder is determined.

Another suitable basis is the tapped density where the abovementioned container is subject to shaking. Therefore, the value for the tapped density is higher than that for the litre weight.

For the shaped body the density is given by the weight and the three-dimensional geometry, so that the volume can be calculated, e.g. for a cylindrical shape the product of the circular area and the height. This can be adjusted by a void fraction factor because normally the space of a hollow body will not be filled completely by the shaped bodies. This void fraction factor can easily be determined by calculation and is only dependent on the shape of the body.

The MOF containing powder has a fine powdery to powdery grain size and may contain or consist of crystallites (small crystals). According to the present invention the term "powder" is used for all forms described above as well as mixtures thereof. The maximum grain size of the powder is preferably less than 0,2 mm for each direction.

The shaped body can have any form suitable for the planned use. Preferably, it is pellet, tablet or bar shaped. In the context of the present invention, the term "shaped body" preferably refers to any solid body that extends to at least 0,2 mm in at least one direction in space. No other restrictions apply, i.e., the body may take any conceivable shape and may extend in any direction by any length so long as it preferably extends to at least 0.2 mm in one direction. In a more preferred embodiment, the shaped bodies do not extend to more than 50 mm and not to less than 0,2 mm in all directions. In a further preferred embodiment, this range is limited from 1 mm to 16 mm, preferably from 1,5 mm to 5 mm.

As far as the geometry of these shaped bodies is concerned, spherical or cylindrical bodies are also preferred, as well as disk-shaped pellets or any other suitable geometry such as honeycombs, meshes, hollow bodies, wire arrangements etc.

The MOF containing powder includes a metal-organic framework material which is built up from metal ions and at least bidentate organic compounds coordinately bound to said metal ion. The MOF as such comprises cavities which are accessible by pores. One cavity is defined by eight metal ions linked together by at least bidentate organic compounds.

As has been mentioned above, the MOF is described in, for example, U.S. Pat. No. 5,648,508, EP-A-0 709 253, M. O'Keeffe et al., *J. Sol. State Chem.*, 152 (2000) p. 3-20, H. Li et al., *Nature* 402 (1999) p. 276 seq., M. Eddaoudi et al., *Topics in Catalysis* 9 (1999) p. 105-111, B. Chen et al., *Science* 291 (2001) p. 1021-23 and DE-A-101 11 230.

The MOFs, as used in the present invention, comprise pores, particularly micro- and/or mesopores. Micropores are defined as being pores having a diameter of 2 nm or below and mesopores as being pores having a diameter in the range of 2 nm to 50 nm, according to the definition given in *Pure Applied Chem.* 45, p. 71 seq., particularly on p. 79 (1976). The presence of the micro- and/or mesopores can be monitored by sorption measurements which determine the capacity of the metal-organic framework materials for nitrogen uptake at 77 K according to DIN 66131 and/or DIN 66134.

For example, a type-I-form of the isothermal curve indicates the presence of micropores [see, for example, paragraph 4 of M. Eddaoudi et al., *Topics in Catalysis* 9 (1999)]. In a preferred embodiment, the specific surface area, as calculated according to the Langmuir model (DIN 66131, 66134) preferably is above 5 $m^2/g$, more preferred above 10 $m^2/g$, even more preferably above 50 $m^2/g$, even more preferred above 500 $m^2/g$, even more preferred above 1000 $m^2/g$, even more preferred above 1500 $m^2/g$, even more preferred above 2500 $m^2/g$ and may increase into the region above 4500 $m^2/g$.

As to the metal component within the framework material that is to be used according to the present invention, particularly to be mentioned are the metal ions of the main group elements and of the subgroup elements of the periodic system of the elements, namely of the groups Ia, Ia, IIIa, IVa to VIIIa and Ib to VIb. Among those metal components, particular reference is made to Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Ti, Si, Ge, Sn, Pb, As, Sb, and Bi, more preferably to Zn, Cu, Ni, Pd, Pt, Ru, Rh and Co. As to the metal ions of these elements, particular reference is made to: $Mg^{2+}$, $Ca^{2+}$, $Sr^{2+}$, $Ba^{2+}$, $Sc^{3+}$, $y^{3+}$, $Ti^{4+}$, $Zr^{4+}$, $Hf^{2+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{2+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{2+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$ and $Bi^{+}$.

With regard to the preferred metal ions and further details regarding the same, particular reference is made to: U.S. Pat. No. 5,648,508, particularly to col. 11, line 11 to 51, section "The Metal Ions", which section is incorporated herein by reference.

In addition to the metal salts disclosed in EP-A 0 790 253 and U.S. Pat. No. 5,648,508, other metallic compounds can be used, such as sulfates, phosphates and other complex counter-ion metal salts of the main- and subgroup metals of the periodic system of the elements. Metal oxides, mixed oxides and mixtures of metal oxides and/or mixed oxides with or without a defined stoichiometry are preferred. All of the above mentioned metal compounds can be soluble or insoluble.

As to the at least bidentate organic compound, which is capable of coordination with the metal ion, in principle all compounds can be used which are suitable for this purpose and which fulfill the above requirements of being at least bidentate. Said organic compound must have at least two centers, which are capable to coordinate the metal ions of a metal salt, particularly with the metals of the aforementioned groups. With regard to the at least bidentate organic compound, specific mention is to be made of compounds having i) an alkyl group substructure, having from 1 to 10 carbon atoms, ii) an aryl group substructure, having from 1 to 5 phenyl rings, iii) an alkyl or aryl amine substructure, consisting of alkyl groups having from 1 to 10 carbon atoms or aryl groups having from 1 to 5 phenyl rings, said substructures having bound thereto at least one at least bidentate functional group "X", which is covalently bound to the substructure of said compound, and wherein X is selected from the group consisting of $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, wherein R is an alkyl group having from 1 to 5 carbon atoms, or an aryl group consisting of 1 to 2 phenyl rings, and $CH(SH)_2$, $C(SH)_3$, $CH(NH_2)_2$, $C(NH_2)_2$, $CH(OH)_2$, $C(OH)_3$, $CH(CN)_2$ and $C(CN)_3$.

Particularly to be mentioned are substituted or unsubstituted, mono- or polynuclear aromatic di-, tri- and tetracarboxylic acids and substituted or unsubstituted, at least one hetero atom comprising aromatic di-, tri- and tetracarboxylic acids, which have one or more nuclei.

A preferred ligand is 1,3,5-benzene tricarboxylic acid (BCT). Further preferred ligands are ADC (acetylene dicarboxylate), NDC (naphtalene dicarboxylate), BDC (benzene dicarboxylate), ATC (adamantane tetracarboxylate), BTC (benzene tricarboxylate), BTB (benzene tribenzoate), MTB (methane tetrabenzoate) and ATB (adamantane tribenzoate).

Besides the at least bidentate organic compound, the framework material as used in accordance with the present invention may also comprise one or more mono-dentate ligand(s), which is/are preferably selected from the following mono-dentate substances and/or derivatives thereof:

a. alkyl amines and their corresponding alkyl ammonium salts, containing linear, branched, or cyclic aliphatic groups, having from 1 to 20 carbon atoms (and their corresponding ammonium salts);
b. aryl amines and their corresponding aryl ammonium salts having from 1 to 5 phenyl rings;
c. alkyl phosphonium salts, containing linear, branched, or cyclic aliphatic groups, having from 1 to 20 carbon atoms;
d. aryl phosphonium salts, having from 1 to 5 phenyl rings;
e. alkyl organic acids and the corresponding alkyl organic anions (and salts) containing linear, branched, or cyclic aliphatic groups, having from 1 to 20 carbon atoms;
f. aryl organic acids and their corresponding aryl organic anions and salts, having from 1 to 5 phenyl rings;
g. aliphatic alcohols, containing linear, branched, or cyclic aliphatic groups, having from 1 to 20 carbon atoms;
h. aryl alcohols having from 1 to 5 phenyl rings;
i. inorganic anions from the group consisting of: sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, and the corresponding acids and salts of the aforementioned inorganic anions,
j. ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ethanolamine, triethylamine and trifluoromethylsulfonic acid.

Further details regarding the at least bidentate organic compounds and the mono-dentate substances, from which the ligands of the framework material as used in the present application are derived, can be taken from EP-A 0 790 253, whose respective content is incorporated into the present application by reference.

Within the present application, framework materials of the kind described herein, which comprise $Zn^{2+}$ as a metal ion and ligands derived from terephthalic acid as the bidentate compound, are particularly preferred. Said framework materials are known as MOF-5 in the literature.

Further metal ions, at least bidentate organic compounds and mono-dentate substances, which are respectively useful for the preparation of the framework materials used in the present invention as well as processes for their preparation are particularly disclosed in EP-A 0 790 253, U.S. Pat. No. 5,648,508 and DE-A-101 11 230.

As solvents, which are particularly useful for the preparation of MOF-5, in addition to the solvents disclosed in the above-referenced literature, dimethyl formamide, diethyl formamide and N-methylpyrollidone, alone, in combination with each other or in combination with other solvents may be used. Within the preparation of the framework materials, particularly within the preparation of MOF-5, the solvents and mother liquors are recycled after crystallization in order to save costs and materials.

The pore sizes of the metal-organic framework can be adjusted by selecting suitable organic ligands and/or bidendate compounds (=linkers). Generally, the larger the linker the larger the pore size. Any pore size that is still supported by a MOF in the absence of a host and at temperatures of at least 200° C. is conceivable. Pore sizes ranging from 0,2 nm to 30 nm are preferred, with pore sizes ranging from 0,3 nm to 3 nm being particularly preferred.

In the following, examples of metal-organic framework materials (MOFs) are given to illustrate the general concept given above. These specific examples, however, are not meant to limit the generality and scope of the present application.

By way of example, a list of metal-organic framework materials already synthesized and characterized is given below. This also includes novel isoreticular metal organic framework materials (IR-MOFs), which may be used in the framework of the present application. Such materials having the same framework topology while displaying different pore sizes and crystal densities are described, for example in M. Eddouadi et al., *Science* 295 (2002) 469, which is incorporated into the present application by reference.

The solvents used are of particular importance for the synthesis of these materials and are therefore mentioned in the table. The values for the cell parameters (angles $\alpha$, $\beta$ and $\gamma$ as well as the spacings a, b and c, given in Angstrom) have been obtained by x-ray diffraction and represent the space group given in the table as well.

| MOF-n | Ingredients molar ratios M + L | Solvents | $\alpha$ | $\beta$ | $\gamma$ | a | b | c | Space Group |
|---|---|---|---|---|---|---|---|---|---|
| MOF-0 | $Zn(NO_3)_2 \cdot 6H_2O$ $H_3(BTC)$ | ethanol | 90 | 90 | 120 | 16.711 | 16.711 | 14.189 | P6(3)/Mcm |
| MOF-2 | $Zn(NO_3)_2 \cdot 6H_2O$ (0.246 mmol) $H_2(BDC)$ 0.241 mmol) | DMF toluene | 90 | 102.8 | 90 | 6.718 | 15.49 | 12.43 | P2(1)/n |
| MOF-3 | $Zn(NO_3)_2 \cdot 6H_2O$ (1.89 mmol) $H_2(BDC)$ (1.93 mmol) | DMF MeOH | 99.72 | 111.11 | 108.4 | 9.726 | 9.911 | 10.45 | P-1 |
| MOF-4 | $Zn(NO_3)_2 \cdot 6H_2O$ (1.00 mmol) $H_3(BTC)$ (0.5 mmol) | ethanol | 90 | 90 | 90 | 14.728 | 14.728 | 14.728 | P2(1)3 |

-continued

| MOF-n | Ingredients molar ratios M + L | Solvents | α | β | γ | a | b | c | Space Group |
|---|---|---|---|---|---|---|---|---|---|
| MOF-5 | Zn(NO$_3$)$_2$•6H$_2$O (2.22 mmol) H$_2$(BDC) (2.17 mmol) | DMF chlorobenzene | 90 | 90 | 90 | 25.669 | 25.669 | 25.669 | Fm-3m |
| MOF-38 | Zn(NO$_3$)$_2$•6H$_2$O (0.27 mmol) H$_3$(BTC) (0.15 mmol) | DMF chlorobenzene | 90 | 90 | 90 | 20.657 | 20.657 | 17.84 | I4cm |
| MOF-31 Zn(ADC)$_2$ | Zn(NO$_3$)$_2$•6H$_2$O 0.4 mmol H$_2$(ADC) 0.8 mmol | ethanol | 90 | 90 | 90 | 10.821 | 10.821 | 10.821 | Pn(−3)m |
| MOF-12 Zn$_2$(ATC) | Zn(NO$_3$)$_2$•6H$_2$O 0.3 mmol H$_4$(ATC) 0.15 mmol | ethanol | 90 | 90 | 90 | 15.745 | 16.907 | 18.167 | Pbca |
| MOF-20 ZnNDC | Zn(NO$_3$)$_2$•6H$_2$O 0.37 mmol H$_2$NDC 0.36 mmol | DMF chlorobenzene | 90 | 92.13 | 90 | 8.13 | 16.444 | 12.807 | P2(1)/c |
| MOF-37 | Zn(NO$_3$)$_2$•6H$_2$O 0.2 mmol H$_2$NDC 0.2 mmol | DEF chlorobenzene | 72.38 | 83.16 | 84.33 | 9.952 | 11.576 | 15.556 | P-1 |
| MOF-8 Tb$_2$(ADC) | Tb(NO$_3$)$_3$•5H$_2$O 0.10 mmol H$_2$ADC 0.20 mmol | DMSO MeOH | 90 | 115.7 | 90 | 19.83 | 9.822 | 19.183 | C2/c |
| MOF-9 Tb$_2$(ADC) | Tb(NO$_3$)$_3$•5H$_2$O 0.08 mmol H$_2$ADB 0.12 mmol | DMSO | 90 | 102.09 | 90 | 27.056 | 16.795 | 28.139 | C2/c |
| MOF-6 | Tb(NO$_3$)$_3$•5H$_2$O 0.30 mmol H$_2$(BDC) 0.30 mmol | DMF MeOH | 90 | 91.28 | 90 | 17.599 | 19.996 | 10.545 | P21/c |
| MOF-7 | Tb(NO$_3$)$_3$•5H$_2$O 0.15 mmol H$_2$(BDC) 0.15 mmol | H$_2$O | 102.3 | 91.12 | 101.5 | 6.142 | 10.069 | 10.096 | P-1 |
| MOF-69A | Zn(NO$_3$)$_2$•6H$_2$O 0.083 mmol 4,4'BPDC 0.041 mmol | DEF H$_2$O$_2$ MeNH$_2$ | 90 | 111.6 | 90 | 23.12 | 20.92 | 12 | C2/c |
| MOF-69B | Zn(NO$_3$)$_2$•6H$_2$O 0.083 mmol 2,6-NCD 0.041 mmol | DEF H$_2$O$_2$ MeNH$_2$ | 90 | 95.3 | 90 | 20.17 | 18.55 | 12.16 | C2/c |
| MOF-11 Cu$_2$(ATC) | Cu(NO$_3$)$_2$•2.5H$_2$O 0.47 mmol H$_2$ATC 0.22 mmol | H$_2$O | 90 | 93.86 | 90 | 12.987 | 11.22 | 11.336 | C2/c |
| MOF-11 Cu$_2$(ATC) dehydr. | | | 90 | 90 | 90 | 8.4671 | 8.4671 | 14.44 | P42/mmc |
| MOF-14 Cu$_3$(BTB) | Cu(NO$_3$)$_2$•2.5H$_2$O 0.28 mmol H$_3$BTB 0.052 mmol | H$_2$O DMF EtOH | 90 | 90 | 90 | 26.946 | 26.946 | 26.946 | Im-3 |
| MOF-32 Cd(ATC) | Cd(NO$_3$)$_2$•4H$_2$O 0.24 mmol H$_4$ATC 0.10 mmol | H$_2$O NaOH | 90 | 90 | 90 | 13.468 | 13.468 | 13.468 | P(−4)3m |
| MOF-33 Zn$_2$(ATB) | ZnCl$_2$ 0.15 mmol H$_4$ATB 0.02 mmol | H$_2$O DMF EtOH | 90 | 90 | 90 | 19.561 | 15.255 | 23.404 | Imma |
| MOF-34 Ni(ATC) | Ni(NO$_3$)$_2$•6H$_2$O 0.24 mmol H$_4$ATC 0.10 mmol | H$_2$O NaOH | 90 | 90 | 90 | 10.066 | 11.163 | 19.201 | P2$_1$2$_1$2$_1$ |
| MOF-36 Zn$_2$(MTB) | Zn(NO$_3$)$_2$•4H$_2$O 0.20 mmol H$_4$MTB 0.04 mmol | H$_2$O DMF | 90 | 90 | 90 | 15.745 | 16.907 | 18.167 | Pbca |

-continued

| MOF-n | Ingredients molar ratios M + L | Solvents | α | β | γ | a | b | c | Space Group |
|---|---|---|---|---|---|---|---|---|---|
| MOF-39 Zn₃O(HBTB) | Zn(NO₃)₂ 4H₂O 0.27 mmol H₃BTB 0.07 mmol | H₂O DMF EtOH | 90 | 90 | 90 | 17.158 | 21.591 | 25.308 | Pnma |
| NO305 | FeCl₂•4H₂O 5.03 mmol formic acid 86.90 mmol | DMF | 90 | 90 | 120 | 8.2692 | 8.2692 | 63.566 | R-3c |
| NO306A | FeCl₂•4H₂O 5.03 mmol formic acid 86.90 mmol | DEF | 90 | 90 | 90 | 9.9364 | 18.374 | 18.374 | Pbcn |
| NO29 MOF-0 like | Mn(Ac)₂•4H₂O 0.46 mmol H₃BTC 0.69 mmol | DMF | 120 | 90 | 90 | 14.16 | 33.521 | 33.521 | P-1 |
| BPR48A2 | Zn(NO₃)₂ 6H₂O 0.012 mmol H₂BDC 0.012 mmol | DMSO toluene | 90 | 90 | 90 | 14.5 | 17.04 | 18.02 | Pbca |
| BPR69B1 | Cd(NO₃)₂ 4H₂O 0.0212 mmol H₂BDC 0.0428 mmol | DMSO | 90 | 98.76 | 90 | 14.16 | 15.72 | 17.66 | Cc |
| BPR92A2 | Co(NO₃)₂•6H₂O 0.018 mmol H₂BDC 0.018 mmol | NMP | 106.3 | 107.63 | 107.2 | 7.5308 | 10.942 | 11.025 | P1 |
| BPR95C5 | Cd(NO₃)₂ 4H₂O 0.012 mmol H₂BDC 0.36 mmol | NMP | 90 | 112.8 | 90 | 14.460 | 11.085 | 15.829 | P2(1)/n |
| Cu C₆H₄O₆ | Cu(NO₃)₂•2.5H₂O 0.370 mmol H₂BDC(OH)₂ 0.37 mmol | DMF chlorobenzene | 90 | 105.29 | 90 | 15.259 | 14.816 | 14.13 | P2(1)/c |
| M(BTC) MOF-0like | Co(SO₄) H₂O 0.055 mmol H₃BTC 0.037 mmol | DMF | | Same as MOF-0 | | | | | |
| Tb(C₆H₄O₆) | Tb(NO₃)₃•5H₂O 0.370 mmol H₂(C₆H₄O₆) 0.56 mmol | DMF chlorobenzene | 104.6 | 107.9 | 97.147 | 10.491 | 10.981 | 12.541 | P-1 |
| Zn (C₂O₄) | ZnCl₂ 0.370 mmol oxalic acid 0.37 mmol | DMF chlorobenzene | 90 | 120 | 90 | 9.4168 | 9.4168 | 8.464 | P(−3)1m |
| Co(CHO) | Co(NO₃)₂•5H₂O 0.043 mmol formic acid 1.60 mmol | DMF | 90 | 91.32 | 90 | 11.328 | 10.049 | 14.854 | P2(1)/n |
| Cd(CHO) | Cd(NO₃)₂•4H₂O 0.185 mmol formic acid 0.185 mmol | DMF | 90 | 120 | 90 | 8.5168 | 8.5168 | 22.674 | R-3c |
| Cu(C₃H₂O₄) | Cu(NO₃)₂•2.5H₂O 0.043 mmol malonic acid 0.192 mmol | DMF | 90 | 90 | 90 | 8.366 | 8.366 | 11.919 | P43 |
| Zn₆ (NDC)₅ MOF-48 | Zn(NO₃)₂•6H₂O 0.097 mmol 14 NDC 0.069 mmol | DMF chlorobenzene H₂O₂ | 90 | 95.902 | 90 | 19.504 | 16.482 | 14.64 | C2/m |
| MOF-47 | Zn(NO₃)₂ 6H₂O 0.185 mmol H₂(BDC[CH₃]₄) 0.185 mmol | DMF chlorobenzene H₂O₂ | 90 | 92.55 | 90 | 11.303 | 16.029 | 17.535 | P2(1)/c |
| MO25 | Cu(NO₃)₂•2.5H₂O 0.084 mmol BPhDC 0.085 mmol | DMF | 90 | 112.0 | 90 | 23.880 | 16.834 | 18.389 | P2(1)/c |

-continued

| MOF-n | Ingredients molar ratios M + L | Solvents | α | β | γ | a | b | c | Space Group |
|---|---|---|---|---|---|---|---|---|---|
| Cu-Thio | $Cu(NO_3)_2 \cdot 2.5H_2O$ 0.084 mmol thiophene dicarboxylic 0.085 mmol | DEF | 90 | 113.6 | 90 | 15.4747 | 14.514 | 14.032 | P2(1)/c |
| ClBDC1 | $Cu(NO_3)_2 \cdot 2.5H_2O$ 0.084 mmol $H_2(BDCCl_2)$ 0.085 mmol | DMF | 90 | 105.6 | 90 | 14.911 | 15.622 | 18.413 | C2/c |
| MOF-101 | $Cu(NO_3)_2 \cdot 2.5H_2O$ 0.084 mmol BrBDC 0.085 mmol | DMF | 90 | 90 | 90 | 21.607 | 20.607 | 20.073 | Fm3m |
| $Zn_3(BTC)_2$ | $ZnCl_2$ 0.033 mmol $H_3BTC$ 0.033 mmol | DMF EtOH base added | 90 | 90 | 90 | 26.572 | 26.572 | 26.572 | Fm-3m |
| MOF-j | $Co(CH_3CO_2)_2 \cdot 4H_2O$ (1.65 mmol) $H_3(BZC)$ (0.95 mmol) | $H_2O$ | 90 | 112.0 | 90 | 17.482 | 12.963 | 6.559 | C2 |
| MOF-n | $Zn(NO_3)_2 \cdot 6H_2O$ $H_3(BTC)$ | ethanol | 90 | 90 | 120 | 16.711 | 16.711 | 14.189 | P6(3)/mcm |
| PbBDC | $Pb(NO_3)_2$ (0.181 mmol) $H_2(BDC)$ (0.181 mmol) | DMF ethanol | 90 | 102.7 | 90 | 8.3639 | 17.991 | 9.9617 | P2(1)/n |
| Znhex | $Zn(NO_3)_2 \cdot 6H_2O$ (0.171 mmol) $H_3BTB$ (0.114 mmol) | DMF p-xylene ethanol | 90 | 90 | 120 | 37.1165 | 37.117 | 30.019 | P3(1)c |
| AS16 | $FeBr_2$ 0.927 mmol $H_2(BDC)$ 0.927 mmol | DMF anhydr. | 90 | 90.13 | 90 | 7.2595 | 8.7894 | 19.484 | P2(1)c |
| AS27-2 | $FeBr_2$ 0.927 mmol $H_3(BDC)$ 0.464 mmol | DMF anhydr. | 90 | 90 | 90 | 26.735 | 26.735 | 26.735 | Fm3m |
| AS32 | $FeCl_3$ 1.23 mmol $H_2(BDC)$ 1.23 mmol | DMF anhydr. ethanol | 90 | 90 | 120 | 12.535 | 12.535 | 18.479 | P6(2)c |
| AS54-3 | $FeBr_2$ 0.927 BPDC 0.927 mmol | DMF anhydr. n-propanol | 90 | 109.98 | 90 | 12.019 | 15.286 | 14.399 | C2 |
| AS61-4 | $FeBr_2$ 0.927 mmol m-BDC 0.927 mmol | pyridine anhydr. | 90 | 90 | 120 | 13.017 | 13.017 | 14.896 | P6(2)c |
| AS68-7 | $FeBr_2$ 0.927 mmol m-BDC 1.204 mmol | DMF anhydr. Pyridine | 90 | 90 | 90 | 18.3407 | 10.036 | 18.039 | Pca2$_1$ |
| Zn(ADC) | $Zn(NO_3)_2 \cdot 6H_2O$ 0.37 mmol $H_2(ADC)$ 0.36 mmol | DMF chlorobenzene | 90 | 99.85 | 90 | 16.764 | 9.349 | 9.635 | C2/c |
| MOF-12 $Zn_2$ (ATC) | $Zn(NO_3)_2 \cdot 6H_2O$ 0.30 mmol $H_4(ATC)$ 0.15 mmol | ethanol | 90 | 90 | 90 | 15.745 | 16.907 | 18.167 | Pbca |
| MOF-20 ZnNDC | $Zn(NO_3)_2 \cdot 6H_2O$ 0.37 mmol $H_2NDC$ 0.36 mmol | DMF chlorobenzene | 90 | 92.13 | 90 | 8.13 | 16.444 | 12.807 | P2(1)/c |
| MOF-37 | $Zn(NO_3)_2 \cdot 6H_2O$ 0.20 mmol $H_2NDC$ 0.20 mmol | DEF chlorobenzene | 72.38 | 83.16 | 84.33 | 9.952 | 11.576 | 15.556 | P-1 |
| Zn(NDC) (DMSO) | $Zn(NO_3)_2 \cdot 6H_2O$ $H_2NDC$ | DMSO | 68.08 | 75.33 | 88.31 | 8.631 | 10.207 | 13.114 | P-1 |
| Zn(NDC) | $Zn(NO_3)_2 \cdot 6H_2O$ $H_2NDC$ | | 90 | 99.2 | 90 | 19.289 | 17.628 | 15.052 | C2/c |

-continued

| MOF-n | Ingredients molar ratios M + L | Solvents | α | β | γ | a | b | c | Space Group |
|---|---|---|---|---|---|---|---|---|---|
| Zn(HPDC) | Zn(NO$_3$)$_2$•4H$_2$O 0.23 mmol H$_2$(HPDC) 0.05 mmol | DMF H$_2$O | 107.9 | 105.06 | 94.4 | 8.326 | 12.085 | 13.767 | P-1 |
| Co(HPDC) | Co(NO$_3$)$_2$•6H$_2$O 0.21 mmol H$_2$(HPDC) 0.06 mmol | DMF H$_2$O/ ethanol | 90 | 97.69 | 90 | 29.677 | 9.63 | 7.981 | C2/c |
| Zn$_3$(PDC)2.5 | Zn(NO$_3$)$_2$•4H$_2$O 0.17 mmol H$_2$(HPDC) 0.05 mmol | DMF/ ClBz H$_2$0/ TEA | 79.34 | 80.8 | 85.83 | 8.564 | 14.046 | 26.428 | P-1 |
| Cd$_2$(TPDC)2 | Cd(NO$_3$)$_2$•4H$_2$O 0.06 mmol H$_2$(HPDC) 0.06 mmol | methanol/ CHP H$_2$O | 70.59 | 72.75 | 87.14 | 10.102 | 14.412 | 14.964 | P-1 |
| Tb(PDC)1.5 | Tb(NO$_3$)$_3$•5H$_2$O 0.21 mmol H$_2$(PDC) 0.034 mmol | DMF H$_2$O/ ethanol | 109.8 | 103.61 | 100.14 | 9.829 | 12.11 | 14.628 | P-1 |
| ZnDBP | Zn(NO$_3$)$_2$•6H$_2$O 0.05 mmol dibenzylphosphate 0.10 mmol | MeOH | 90 | 93.67 | 90 | 9.254 | 10.762 | 27.93 | P2/n |
| Zn$_3$(BPDC) | ZnBr$_2$ 0.021 mmol 4,4'BPDC 0.005 mmol | DMF | 90 | 102.76 | 90 | 11.49 | 14.79 | 19.18 | P21/n |
| CdBDC | Cd(NO$_3$)$_2$•4H$_2$O 0.100 mmol H$_2$(BDC) 0.401 mmol | DMF Na$_2$SiO$_3$ (aq) | 90 | 95.85 | 90 | 11.2 | 11.11 | 16.71 | P21/n |
| Cd-mBDC | Cd(NO$_3$)$_2$•4H$_2$O 0.009 mmol H$_2$(mBDC) 0.018 mmol | DMF MeNH$_2$ | 90 | 101.1 | 90 | 13.69 | 18.25 | 14.91 | C2/c |
| Zn$_4$OBNDC | Zn(NO$_3$)$_2$•6H$_2$O 0.041 mmol BNDC | DEF MeNH$_2$ H$_2$O$_2$ | 90 | 90 | 90 | 22.35 | 26.05 | 59.56 | Fmmm |
| Eu(TCA) | Eu(NO$_3$)$_3$•6H$_2$O 0.14 mmol TCA 0.026 mmol | DMF chlorobenzene | 90 | 90 | 90 | 23.325 | 23.325 | 23.325 | Pm-3n |
| Tb(TCA) | Tb(NO$_3$)$_3$•6H$_2$O 0.069 mmol TCA 0.026 mmol | DMF chlorobenzene | 90 | 90 | 90 | 23.272 | 23.272 | 23.372 | Pm-3n |
| Formate | Ce(NO$_3$)$_3$•6H$_2$O 0.138 mmol Formic acid 0.43 mmol | H$_2$O ethanol | 90 | 90 | 120 | 10.668 | 10.667 | 4.107 | R-3m |
|  | FeCl$_2$•4H$_2$O 5.03 mmol Formic acid 86.90 mmol | DMF | 90 | 90 | 120 | 8.2692 | 8.2692 | 63.566 | R-3c |
|  | FeCl$_2$•4H$_2$O 5.03 mmol Formic acid 86.90 mmol | DEF | 90 | 90 | 90 | 9.9364 | 18.374 | 18.374 | Pbcn |
|  | FeCl$_2$•4H$_2$O 5.03 mmol Formic acid 86.90 mmol | DEF | 90 | 90 | 90 | 8.335 | 8.335 | 13.34 | P-31c |
| NO330 | FeCl$_2$•4H$_2$O 0.50 mmol Formic acid 8.69 mmol | formamide | 90 | 90 | 90 | 8.7749 | 11.655 | 8.3297 | Pnna |
| NO332 | FeCl$_2$•4H$_2$O 0.50 mmol Formic acid 8.69 mmol | DIP | 90 | 90 | 90 | 10.0313 | 18.808 | 18.355 | Pbcn |
| NO333 | FeCl$_2$•4H$_2$O 0.50 mmol Formic acid 8.69 mmol | DBF | 90 | 90 | 90 | 45.2754 | 23.861 | 12.441 | Cmcm |

-continued

| MOF-n | Ingredients molar ratios M + L | Solvents | α | β | γ | a | b | c | Space Group |
|---|---|---|---|---|---|---|---|---|---|
| NO335 | FeCl$_2$•4H$_2$O 0.50 mmol Formic acid 8.69 mmol | CHF | 90 | 91.372 | 90 | 11.5964 | 10.187 | 14.945 | P21/n |
| NO336 | FeCl$_2$•4H$_2$O 0.50 mmol Formic acid 8.69 mmol | MFA | 90 | 90 | 90 | 11.7945 | 48.843 | 8.4136 | Pbcm |
| NO13 | Mn(Ac)$_2$•4H$_2$O 0.46 mmol Bezoic acid 0.92 mmol Bipyridine 0.46 mmol | ethanol | 90 | 90 | 90 | 18.66 | 11.762 | 9.418 | Pbcn |
| NO29 MOF-0 Like | Mn(Ac)$_2$•4H$_2$O 0.46 mmol H$_3$BTC 0.69 mmol | DMF | 120 | 90 | 90 | 14.16 | 33.521 | 33.521 | P-1 |
| Mn(hfac)$_2$ (O$_2$CC$_6$H$_5$) | Mn(Ac)$_2$•4H$_2$O 0.46 mmol Hfac 0.92 mmol Bipyridine 0.46 mmol | ether | 90 | 95.32 | 90 | 9.572 | 17.162 | 14.041 | C2/c |
| BPR43G2 | Zn(NO$_3$)$_2$•6H$_2$O 0.0288 mmol H$_2$BDC 0.0072 mmol | DMF CH$_3$CN | 90 | 91.37 | 90 | 17.96 | 6.38 | 7.19 | C2/c |
| BPR48A2 | Zn(NO$_3$)$_2$ 6H$_2$O 0.012 mmol H$_2$BDC 0.012 mmol | DMSO toluene | 90 | 90 | 90 | 14.5 | 17.04 | 18.02 | Pbca |
| BPR49B1 | Zn(NO$_3$)$_2$ 6H$_2$O 0.024 mmol H$_2$BDC 0.048 mmol | DMSO methanol | 90 | 91.172 | 90 | 33.181 | 9.824 | 17.884 | C2/c |
| BPR56E1 | Zn(NO$_3$)$_2$ 6H$_2$O 0.012 mmol H$_2$BDC 0.024 mmol | DMSO n-propanol | 90 | 90.096 | 90 | 14.5873 | 14.153 | 17.183 | P2(1)/n |
| BPR68D10 | Zn(NO$_3$)$_2$ 6H$_2$O 0.0016 mmol H$_3$BTC 0.0064 mmol | DMSO benzene | 90 | 95.316 | 90 | 10.0627 | 10.17 | 16.413 | P2(1)/c |
| BPR69B1 | Cd(NO$_3$)$_2$ 4H$_2$O 0.0212 mmol H$_2$BDC 0.0428 mmol | DMSO | 90 | 98.76 | 90 | 14.16 | 15.72 | 17.66 | Cc |
| BPR73E4 | Cd(NO$_3$)$_2$ 4H$_2$O 0.006 mmol H$_2$BDC 0.003 mmol | DMSO toluene | 90 | 92.324 | 90 | 8.7231 | 7.0568 | 18.438 | P2(1)/n |
| BPR76D5 | Zn(NO$_3$)$_2$ 6H$_2$O 0.0009 mmol H$_2$BzPDC 0.0036 mmol | DMSO | 90 | 104.17 | 90 | 14.4191 | 6.2599 | 7.0611 | Pc |
| BPR80B5 | Cd(NO$_3$)$_2$•4H$_2$O 0.018 mmol H$_2$BDC 0.036 mmol | DMF | 90 | 115.11 | 90 | 28.049 | 9.184 | 17.837 | C2/c |
| BPR80H5 | Cd(NO$_3$)$_2$ 4H$_2$O 0.027 mmol H$_2$BDC 0.027 mmol | DMF | 90 | 119.06 | 90 | 11.4746 | 6.2151 | 17.268 | P2/c |
| BPR82C6 | Cd(NO$_3$)$_2$ 4H$_2$O 0.0068 mmol H$_2$BDC 0.202 mmol | DMF | 90 | 90 | 90 | 9.7721 | 21.142 | 27.77 | Fdd2 |
| BPR86C3 | Co(NO$_3$)$_2$ 6H$_2$O 0.0025 mmol H$_2$BDC 0.075 mmol | DMF | 90 | 90 | 90 | 18.3449 | 10.031 | 17.983 | Pca2(1) |

-continued

| MOF-n | Ingredients molar ratios M + L | Solvents | α | β | γ | a | b | c | Space Group |
|---|---|---|---|---|---|---|---|---|---|
| BPR86H6 | Cd(NO$_3$)$_2$•6H$_2$O 0.010 mmol H$_2$BDC 0.010 mmol | DMF | 80.98 | 89.69 | 83.412 | 9.8752 | 10.263 | 15.362 | P-1 |
| BPR95A2 | Co(NO$_3$)$_2$ 6H$_2$O Zn(NO$_3$)$_2$ 6H$_2$O 0.012 mmol H$_2$BDC 0.012 mmol | NMP NMP | 106.3 90 | 107.63 102.9 | 107.2 90 | 7.5308 7.4502 | 10.942 13.767 | 11.025 12.713 | P1 P2(1)/c |
| CuC$_6$F$_4$O$_4$ | Cu(NO$_3$)$_2$•2.5H$_2$O 0.370 mmol H$_2$BDC(OH)$_2$ 0.37 mmol | DMF chlorobenzene | 90 | 98.834 | 90 | 10.9675 | 24.43 | 22.553 | P2(1)/n |
| Fe Formic | FeCl$_2$•4H$_2$O 0.370 mmol Formic acid 0.37 mmol | DMF | 90 | 91.543 | 90 | 11.495 | 9.963 | 14.48 | P2(1)/n |
| Mg Formic | Mg(NO$_3$)$_2$•6H$_2$O 0.370 mmol Formic acid 0.37 mmol | DMF | 90 | 91.359 | 90 | 11.383 | 9.932 | 14.656 | P2(1)/n |
| MgC$_6$H$_4$O$_6$ | Mg(NO$_3$)$_2$•6H$_2$O 0.370 mmol H$_2$BDC(OH)$_2$ 0.37 mmol | DMF | 90 | 96.624 | 90 | 17.245 | 9.943 | 9.273 | C2/c |
| Zn C$_2$H$_4$BDC MOF-38 | ZnCl$_2$ 0.44 mmol CBBDC 0.261 mmol | DMF | 90 | 94.714 | 90 | 7.3386 | 16.834 | 12.52 | P2(1)/n |
| MOF-49 | ZnCl$_2$ 0.44 mmol m-BDC 0.261 mmol | DMF CH3CN | 90 | 93.459 | 90 | 13.509 | 11.984 | 27.039 | P2/c |
| MOF-26 | Cu(NO$_3$)$_2$•5H$_2$O 0.084 mmol DCPE 0.085 mmol | DMF | 90 | 95.607 | 90 | 20.8797 | 16.017 | 26.176 | P2(1)/n |
| MOF-112 | Cu(NO$_3$)$_2$•2.5H$_2$O 0.084 mmol o-Br-m-BDC 0.085 mmol | DMF ethanol | 90 | 107.49 | 90 | 29.3241 | 21.297 | 18.069 | C2/c |
| MOF-109 | Cu(NO$_3$)$_2$•2.5H$_2$O 0.084 mmol KDB 0.085 mmol | DMF | 90 | 111.98 | 90 | 23.8801 | 16.834 | 18.389 | P2(1)/c |
| MOF-111 | Cu(NO$_3$)$_2$•2.5H$_2$O 0.084 mmol o-BrBDC 0.085 mmol | DMF ethanol | 90 | 102.16 | 90 | 10.6767 | 18.781 | 21.052 | C2/c |
| MOF-110 | Cu(NO$_3$)$_2$•2.5H$_2$O 0.084 mmol thiophene dicarboxylic 0.085 mmol | DMF | 90 | 90 | 120 | 20.0652 | 20.065 | 20.747 | R-3/m |
| MOF-107 | Cu(NO$_3$)$_2$•2.5H$_2$O 0.084 mmol thiophene dicarboxylic 0.085 mmol | DEF | 104.8 | 97.075 | 95.206 | 11.032 | 18.067 | 18.452 | P-1 |
| MOF-108 | Cu(NO$_3$)$_2$•2.5H$_2$O 0.084 mmol thiophene dicarboxylic 0.085 mmol | DBF/ methanol | 90 | 113.63 | 90 | 15.4747 | 14.514 | 14.032 | C2/c |
| MOF-102 | Cu(NO$_3$)$_2$•2.5H$_2$O 0.084 mmol H$_2$(BDCCl$_2$) 0.085 mmol | DMF | 91.63 | 106.24 | 112.01 | 9.3845 | 10.794 | 10.831 | P-1 |
| Clbdc1 | Cu(NO$_3$)$_2$•2.5H$_2$O 0.084 mmol H$_2$(BDCCl$_2$) 0.085 mmol | DEF | 90 | 105.56 | 90 | 14.911 | 15.622 | 18.413 | P-1 |

-continued

| MOF-n | Ingredients molar ratios M + L | Solvents | α | β | γ | a | b | c | Space Group |
|---|---|---|---|---|---|---|---|---|---|
| Cu(NMOP) | Cu(NO$_3$)$_2$·2.5H$_2$O 0.084 mmol NBDC 0.085 mmol | DMF | 90 | 102.37 | 90 | 14.9238 | 18.727 | 15.529 | P2(1)/M |
| Tb(BTC) | Tb(NO$_3$)$_3$·5H$_2$O 0.033 mmol H$_3$BTC 0.033 mmol | DMF | 90 | 106.02 | 90 | 18.6986 | 11.368 | 19.721 | |
| Zn$_3$(BTC)$_2$ Honk | ZnCl$_2$ 0.033 mmol H$_3$BTC 0.033 mmol | DMF ethanol | 90 | 90 | 90 | 26.572 | 26.572 | 26.572 | Fm-3m |
| Zn$_4$O(NDC) | Zn(NO$_3$)$_2$·4H$_2$O 0.066 mmol 14NDC 0.066 mmol | DMF ethanol | 90 | 90 | 90 | 41.5594 | 18.818 | 17.574 | aba2 |
| CdTDC | Cd(NO$_3$)$_2$·4H$_2$O 0.014 mmol thiophene 0.040 mmol DABCO 0.020 mmol | DMF H$_2$O | 90 | 90 | 90 | 12.173 | 10.485 | 7.33 | Pmma |
| IRMOF-2 | Zn(NO$_3$)$_2$·4H$_2$O 0.160 mmol o-Br-BDC 0.60 mmol | DEF | 90 | 90 | 90 | 25.772 | 25.772 | 25.772 | Fm-3m |
| IRMOF-3 | Zn(NO$_3$)$_2$·4H$_2$O 0.20 mmol H$_2$N-BDC 0.60 mmol | DEF ethanol | 90 | 90 | 90 | 25.747 | 25.747 | 25.747 | Fm-3m |
| IRMOF-4 | Zn(NO$_3$)$_2$·4H$_2$O 0.11 mmol [C$_3$H$_7$O]$_2$-BDC 0.48 mmol | DEF | 90 | 90 | 90 | 25.849 | 25.849 | 25.849 | Fm-3m |
| IRMOF-5 | Zn(NO$_3$)$_2$·4H$_2$O 0.13 mmol [C$_5$H$_{11}$O]$_2$-BDC 0.50 mmol | DEF | 90 | 90 | 90 | 12.882 | 12.882 | 12.882 | Pm-3m |
| IRMOF-6 | Zn(NO$_3$)$_2$·4H$_2$O 0.20 mmol [C$_2$H$_4$]-BDC 0.60 mmol | DEF | 90 | 90 | 90 | 25.842 | 25.842 | 25.842 | Fm-3m |
| IRMOF-7 | Zn(NO$_3$)$_2$·4H$_2$O 0.07 mmol 1,4NDC 0.20 mmol | DEF | 90 | 90 | 90 | 12.914 | 12.914 | 12.914 | Pm-3m |
| IRMOF-8 | Zn(NO$_3$)$_2$·4H$_2$O 0.55 mmol 2,6NDC 0.42 mmol | DEF | 90 | 90 | 90 | 30.092 | 30.092 | 30.092 | Fm-3m |
| IRMOF-9 | Zn(NO$_3$)$_2$·4H$_2$O 0.05 mmol BPDC 0.42 mmol | DEF | 90 | 90 | 90 | 17.147 | 23.322 | 25.255 | Pnnm |
| IRMOF-10 | Zn(NO$_3$)$_2$·4H$_2$O 0.02 mmol BPDC 0.012 mmol | DEF | 90 | 90 | 90 | 34.281 | 34.281 | 34.281 | Fm-3m |
| IRMOF-11 | Zn(NO$_3$)$_2$·4H$_2$O 0.05 mmol HPDC 0.20 mmol | DEF | 90 | 90 | 90 | 24.822 | 24.822 | 56.734 | R-3m |
| IRMOF-12 | Zn(NO$_3$)$_2$·4H$_2$O 0.017 mmol HPDC 0.12 mmol | DEF | 90 | 90 | 90 | 34.281 | 34.281 | 34.281 | Fm-3m |
| IRMOF-13 | Zn(NO$_3$)$_2$·4H$_2$O 0.048 mmol PDC 0.31 mmol | DEF | 90 | 90 | 90 | 24.822 | 24.822 | 56.734 | R-3m |
| IRMOF-14 | Zn(NO$_3$)$_2$·4H$_2$O 0.17 mmol PDC 0.12 mmol | DEF | 90 | 90 | 90 | 34.381 | 34.381 | 34.381 | Fm-3m |

-continued

| MOF-n | Ingredients molar ratios M + L | Solvents | α | β | γ | a | b | c | Space Group |
|---|---|---|---|---|---|---|---|---|---|
| IRMOF-15 | Zn(NO$_3$)$_2$·4H$_2$O 0.063 mmol TPDC 0.025 mmol | DEF | 90 | 90 | 90 | 21.459 | 21.459 | 21.459 | Im-3m |
| IRMOF-16 | Zn(NO$_3$)$_2$·4H$_2$O 0.0126 mmol TPDC 0.05 mmol | DEF NMP | 90 | 90 | 90 | 21.49 | 21.49 | 21.49 | Pm-3m |

ADC Acetylene dicarboxylic acid
NDC Naphtalene dicarboxylic acid
BDC Benzene dicarboxylic acid
ATC Adamantane tetracarboxylic acid
BTC Benzene tricarboxylic acid
BTB Benzene tribenzoate
MTB Methane tetrabenzoate
ATB Adamantane tetrabenzoate
ADB Adamantane dibenzoate Other MOFs known in the art are MOF-177 and MOF-178.

Examples for the synthesis of these materials in form of a powder can, for example, be found in: J. Am. Chem. Soc. 123 (2001) pages 8241 seq. or in Acc. Chem. Res. 31 (1998) pages 474 seq., which are fully encompassed within the content of the present application with respect to their respective content.

The separation of the framework materials, particularly of MOF-5, from the mother liquor of the crystallization may be achieved by procedures known in the art such as solid-liquid separations, centrifugation, extraction, filtration, membrane filtration, cross-flow filtration, flocculation using flocculation adjuvants (non-ionic, cationic and anionic adjuvants) or by the addition of pH shifting additives such as salts, acids or bases, by flotation, as well as by evaporation of the mother liquor at elevated temperature and/or in vacuo and concentrating of the solid. The material obtained in this step is typically a fine powder and cannot be used for most practical applications, e.g., in catalysis, where shaped bodies are required.

Appropriate processes of molding a powder are known to the person skilled in the art, referring, in the broadest sense, to a process, wherein i.e. any powder, powdery substance, array of crystallites etc., can be formed into a shaped body that is stable under the conditions of its intended use.

In addition to the optional molding step of a MOF containing powder into a shaped body the following steps may also occur according to the present invention:

(I) the molding may be preceded by a step of mixing,
(II) the molding may be preceded by a step of preparing a paste-like mass or a fluid containing the MOF containing powder, for example by adding solvents, binders or other additional substances,
(III) the molding may be followed by a step of finishing, in particular a step of drying.

The conversion step of molding, shaping or forming and the like may be achieved by any method known to an expert to achieve agglomeration of a powder, a suspension or a paste-like mass. Such methods are described, for example, in Ullmann's Enzylopädie der Technischen Chemie, 4$^{th}$ Edition, Vol. 2, p. 313 et seq., 1972, whose respective content is incorporated into the present application by reference.

In general, the following main pathways can be discerned: (i) briquetting, i.e. mechanical pressing of the powdery material, with or without binders and/or other additives, (ii) granulating (pelletizing), i.e. compacting of moistened powdery materials by subjecting it to rotating movements, and (iii) sintering, i.e. subjecting the material to be compacted to a thermal treatment. The latter is somewhat limited for the material according to the invention due to the limited temperature stability of the organic materials (see below).

Specifically, the molding step according to the invention is preferably performed by using at least one method selected from the following group: briquetting by piston presses, briquetting by roller pressing, binderless briquetting, briquetting with binders, pelletizing, compounding, melting, extruding, co-extruding, spinning, deposition, foaming, spray drying, coating, granulating, in particular spray granulating or granulating according to any process known within the processing of plastics or any combination of at least two of the aforementioned methods.

The molding may be affected by extrusion in conventional extruders, for example such that result in extrudates having a diameter of, usually, from about 1 to about 10 mm, in particular from about 1,5 to about 5 mm. Such extrusion apparatuses are described, for example, in Ullmann's Enzylopädie der Technischen Chemie, 4$^{th}$ Edition, Vol. 2, p. 295 et seq., 1972. In addition to the use of an extruder, an extrusion press is preferably also used for molding.

The preferred process of molding is performed at elevated pressure, i.e. by pressing of the MOF containing powder. The pressure may range from atmospheric pressure to several 100 bar. Also elevated temperatures (ranging from room temperature to 300° C.) or in a protective atmosphere (noble gases, nitrogen or mixtures thereof) are suitable. Any combination of these conditions is possible as well.

The conditions under which the pressing may be accomplished depend on, e.g. the press, the filling height, the press capacity, and the form of the shaped body.

The step of molding can be performed in the presence of binders and/or other additional substances that stabilize the materials to be agglomerated. As to the at least one optional binder, any material known to an expert to promote adhesion between the particles to be molded together can be employed. A binder, an organic viscosity-enhancing compound and/or a liquid for converting the material into a paste can be added to the metal-organic framework material, with the mixture being subsequently compacted in a mixing or kneading apparatus or an extruder. The resulting plastic material can then be molded, in particular using an extrusion press or an extruder, and the resulting moldings can then be subjected to the optional step (III) of finishing, for example drying.

A number of inorganic compounds can be used as binders. Non-limiting examples include titanium dioxide, hydrated titanium dioxide, hydrated alumina or other aluminum-containing binders, mixtures of silicon and aluminum compounds, silicon compounds, clay minerals, alkoxysilanes, and amphiphilic substances.

Other conceivable binders are in principle all compounds used to date for the purpose of achieving adhesion in powdery materials. Compounds, in particular oxides, of silicon, of aluminum, of boron, of phosphorus, of zirconium and/or of titanium are preferably used. Of particular interest as a binder is silica, where the $SiO_2$ may be introduced into the shaping step as a silica sol or in the form of tetraalkoxysilanes. Oxides of magnesium and of beryllium and clays, for example montmorillonites, kaolins, bentonites, halloysites, dickites, nacrites and anauxites, may furthermore be used as binders. Tetraalkoxysilanes are particularly used as binders in the present invention. Specific examples are tetramethoxysilane, tetraethoxysilane, tetrapropoxysilane and tetrabutoxysilane, the analogous tetraalkoxytitanium and tetraalkoxyzirconium compounds and trimethoxy-, triethoxy-, tripropoxy- and tributoxy-aluminum, tetramethoxysilane and tetraethoxysilane being particularly preferred.

The binder may have a concentration of from 0,1 to 20% by weight. Alternatively, no binder is used.

One or more mold release agent may be present as additives. Suitable agents are graphite or MOF materials, where the MOF has a layer composition.

In addition, organic viscosity-enhancing substances and/or hydrophilic polymers, e.g. cellulose or polyacrylates may be used. The organic viscosity-enhancing substance used may likewise be any substance suitable for this purpose. Those preferred are organic, in particular hydrophilic polymers, e.g., cellulose, starch, polyacrylates, polymethacrylates, polyvinyl alcohol, polyvinylpyrrolidone, polyisobutene and polytetrahydrofuran. These substances primarily promote the formation of a plastic material during the kneading, molding and drying step by bridging the primary particles and moreover ensuring the mechanical stability of the molding during the molding and the optional drying process.

There are no restrictions at all with regard to the optional liquid which may be used to create a paste-like substance, either for the optional step (I) of mixing or for the step of molding. In addition to water, alcohols may be used, provided that they are water-miscible. Accordingly, both monoalcohols of 1 to 4 carbon atoms and water-miscible polyhydric alcohols may be used. In particular, methanol, ethanol, propanol, n-butanol, isobutanol, tert-butanol and mixtures of two or more thereof are used.

Amines or amine-like compounds, for example tetraalkylammonium compounds or aminoalcohols, and carbonate-containing substances, such as calcium carbonate, may be used as further additives. Such further additives are described in EP-A 0 389 041, EP-A 0 200 260 and WO 95/19222, which are incorporated fully by reference in the context of the present application.

Most, if not all, of the additive substances mentioned above may be removed from the shaped bodies by drying or heating, optionally in a protective atmosphere or under vacuum. In order to keep the metal-organic framework intact, the shaped bodies are preferably not exposed to temperatures exceeding 300° C. However, studies show that heating/drying under the aforementioned mild conditions, in particular drying in vacuo, preferably well below 300° C. is sufficient to at least remove organic compounds out of the pores of the metal-organic framework. Generally, the conditions are adapted and chosen depending upon the additive substances used.

The order of addition of the components (optional solvent, binder, additives, metal-organic framework material) is not critical. It is possible either to add first the binder, then, for example, the metal-organic framework material and, if required, the additive and finally the mixture containing at least one alcohol and/or water or to interchange the order with respect to any of the aforementioned components.

As far as the optional step (I) of mixing is concerned, for example, of the powder containing a metal-organic framework and a binder and optionally further process materials (=additional materials), all methods known to the expert in the fields of materials processing and unit operations can be used. If the mixing occurs in the liquid phase, stirring is preferred, if the mass to be mixed is paste-like, kneading and/or extruding are preferred and if the components to be mixed are all in a solid, powdery state, mixing is preferred. The use of atomizers, sprayers, diffusers or nebulizers is conceivable as well if the state of the components to be used allows the use thereof. For paste-like (originating from MOF containing powder) and powder-like materials the use of static mixers, planetary mixers, mixers with rotating containers, pan mixers, pug mills, shearing-disk mixers, centrifugal mixers, sand mills, trough kneaders, internal mixers, internal mixers and continuous kneaders are preferred. It is explicitly included that a process of mixing may be sufficient to achieve the molding, i.e., that the steps of mixing and molding coincide.

Another object of the invention is to provide a MOF containing shaped body obtainable from a process according to the invention as described above.

Preferably, the optimized MOF containing shaped body is characterized by the crush strength.

The crush strength is preferably from 5 N to 200 N. This is especially preferred for a shaped body that extends to at least 1 mm in each direction in space and not more than 16 mm.

A remarkably high surface area per volume is found for a shaped body containing a MOF in a selected range of hardness, wherein the shaped body has a crush strength from 16 N to 51 N. Preferably, the crush strength is from 23 N to 51N. This is especially preferred for a shaped body that extends to at least 1 mm in each direction in space and not more than 7 mm, more preferred from 1 mm to 5 mm, most preferred from 3 mm to 4,5 mm.

The crush strength is defined within the meaning of the present invention as lateral pressure resistance to pressure and can be measured with a hardness grading device by Zwick.

The shaped bodies according to the invention can be used in any process known to the expert where a porous body or a body with channels provides an advantage over solid bodies or powders. In particular, such applications include: catalysts, support for catalysts, sorption, storage of fluids, desiccants, ion exchanger materials, molecular sieves (separators), materials for chromatography, materials for the selective release and/or uptaking of molecules, molecular recognition, nano-tubes, nano-reactors.

In a preferred application, the shaped bodies according to the invention are used as catalysts in fixed bed/packed bed reactors. In principle, said shaped bodies can be used in gas phase reactions or in liquid phase reactions, in which case the solid shaped bodies are suspended in a slurry. In principle, the shaped bodies according to the invention can be used to catalyze all reactions known to the expert where the presence of channels and/or pores incorporated therein are known or believed to increase the activity and/or selectivity and/or yield of said reaction.

Another preferred application is the storage of compounds, especially of gaseous compounds.

The invention is now further described by way of the following examples, which are, however, not meant to limit the scope of the present application.

EXAMPLES

Example 1

Preparation of MOF-5

| Starting Material | Molar Amount | Calculated | Experimental |
|---|---|---|---|
| terephthalic acid | 12.3 mmol | 2.04 g | 2.04 g |
| zinc nitrate-tetra hydrate | 36.98 mmol | 9.67 g | 9.68 g |
| diethylformamide (Merck) | 2568.8 mmol | 282.2 g | 282.2 g |

The respective amounts of the starting materials given in the table above are placed in a beaker in the order diethylformamide, terephthalic acid and zinc nitrate. The resulting solution is introduced into two autoclaves (250 ml), having inner walls which are covered by teflon.

The crystallization occurs at 105° C. and within twenty hours. Subsequently, the orange solvent is decanted from the yellow crystals, said crystals are again covered by 20 ml dimethylformamide, the latter again being decanted. This procedure is repeated three times. Subsequently, 20 ml chloroform are poured onto the solid, which is washed and decanted by said solvent two times.

The crystals (14,4 g), which are still containing residual solvent, are introduced into a vacuum device and first dried at room temperature in vacuo ($10^{-4}$ mbar). Afterwards, they are dried at 120° C.

Example 2

Preparation of IR-MOF-8

IR-MOF-8 is prepared in accordance to example 1. 2,6-naphtalene dicarboxylic acid (111 mmol), zinc nitrate-tetrahydrate (222 mmol) and dimethylformaide (500 ml) are shaked in a flask for 20 h at 95° C. After filtration the solid is washed three times with acetone and dried.

Example 3

Preparing Pellets Containing MOF-5 or IR-MOF-8

Pressing of the pellets according to the invention is performed by means of an eccentric press as provided by Korsch (Type EK0). Here, the pellet-forming tool was chosen to be a matrix with a hole of different diameter size (3 or 4,75 mm). The mixture that is fed into the eccentric press to form the shaped body consists of 99.8% by weight MOF and 0.2% by weight graphite, namely of 49.9 g MOF powder and 0.1 g graphite. The two components are mixed thoroughly in a mixing flask. The procedure is performed under nitrogen atmosphere.

The adjustments of the eccentric press are as follows: (i) filling height: 10 mm, (ii) penetrating depth of the upper stamp: 7 mm and (iii) rounds per minute of the rotor: 20.

The shape of the pellet is as follows: (i) circular base with a diameter of 3 or 4.75 mm and (ii) a height of 3 mm.

Example 4

Crush Strength and BET Determination

The lateral pressure resistance to pressure (crush strength) is measured with a hardness grading device by Zwick.

The BET surface area of the powder and the pellets are determined according to DIN 66131.

Example 5

| MOF powder: MOF-5; BET of the powder: 1796 $m^2$/g | | | |
|---|---|---|---|
| Weight per liter (g/l): | 220 | tapped density (g/l): | 303 |
| BET/volume (1000 $m^2$/l): | 395 | | 544 |

Pellet diameter: 4.75 mm; pellet volume: 53.16 $mm^3$; void fraction of a pellet filling: 32%

| crush strength (N) | pellet weight (g) | pellet density (g/$cm^3$) | weight per liter[1] (g/l) | BET ($m^2$/g) | BET/volume (1000 $m^2$/l) | BET/volume ratio pellet:powder |
|---|---|---|---|---|---|---|
| 10 | 0.0310 | 0.583 | 396 | 1532 | 607 | 1.5 |
| 28 | 0.0438 | 0.824 | 560 | 1270 | 711 | 1.8 |
| 51 | 0.0486 | 0.914 | 622 | 1137 | 707 | 1.8 |

[1] Weight per liter = pellet density * (1 − void fraction)

Example 6

| MOF powder: MOF-5; BET of the powder: 1796 $m^2$/g | | | |
|---|---|---|---|
| Weight per liter (g/l): | 220 | tapped density (g/l): | 303 |
| BET/volume (1000 $m^2$/l): | 395 | | 544 |

Pellet diameter: 3 mm; pellet volume: 21.21 $mm^3$; void fraction of a pellet filling: 31%

| crush strength (N) | pellet weight (g) | pellet density (g/$cm^3$) | weight per liter[1] (g/l) | BET ($m^2$/g) | BET/volume (1000 $m^2$/l) | BET/volume ratio pellet:powder |
|---|---|---|---|---|---|---|
| 13 | 0.0178 | 0.839 | 579 | 1119 | 648 | 1.6 |
| 16 | 0.0184 | 0.867 | 598 | 1186 | 709 | 1.8 |
| 29 | 0.0260 | 1.226 | 846 | 973 | 823 | 2.1 |

[1] Weight per liter = pellet density * (1 − void fraction)

Example 7

| MOF powder: MOF-5; BET of the powder: 1270 $m^2$/g | | | |
|---|---|---|---|
| Weight per liter (g/l): | 220 | tapped density (g/l): | 303 |
| BET/volume (1000 $m^2$/l): | 279 | | 385 |

-continued

Pellet diameter: 4.75 mm; pellet volume: 53.16 mm³;
void fraction of a pellet filling: 32%

| crush strength (N) | pellet weight (g) | pellet density (g/cm³) | weight per liter[1] (g/l) | BET (m²/g) | BET/volume (1000 m²/l) | BET/volume ratio pellet:powder |
|---|---|---|---|---|---|---|
| 23.7 | 0.04862 | 0.915 | 622 | 829 | 516 | 1.8 |
| 50.5 | 0.05627 | 1.059 | 720 | 673 | 485 | 1.7 |
| 97.5 | 0.06469 | 1.217 | 828 | 424 | 351 | 1.3 |

[1]Weight per liter = pellet density * (1 − void fraction)

Example 8

MOF powder: IR-MOF-8; BET of the powder: 1136 m²/g

| Weight per liter (g/l): | 230 | tapped density (g/l): | 310 |
|---|---|---|---|
| BET/volume (1000 m²/l): | 261 | | 352 |

Pellet diameter: 3 mm; pellet volume: 21.21 mm³;
void fraction of a pellet filling: 31%

| crush strength (N) | pellet weight (g) | pellet density (g/cm³) | weight per liter[1] (g/l) | BET (m²/g) | BET/volume (1000 m²/l) | BET/volume ratio pellet:powder |
|---|---|---|---|---|---|---|
| 26.7 | 0.0247 | 1.165 | 804 | 625 | 503 | 1.9 |
| 41.2 | 0.0267 | 1.259 | 869 | 547 | 475 | 1.8 |
| 49.5 | 0.0290 | 1.367 | 943 | 544 | 513 | 2.0 |
| 73.1 | 0.0308 | 1.452 | 1001 | 376 | 376 | 1.4 |
| 89.1 | 0.0324 | 1.528 | 1054 | 296 | 312 | 1.2 |

[1]Weight per liter = pellet density * (1 − void fraction)

The invention claimed is:

1. A process for the preparation of a shaped body containing a metal-organic framework material (MOF) comprising the step of converting a MOF containing powder into the shaped body, wherein the ratio of the surface area per volume of the shaped body to the surface area per volume of the powder is at least 1.6:1.

2. The process according to claim 1, wherein the ratio is at least 1.7:1.

3. The process according to claim 1, wherein the step of converting comprises a molding step.

4. The process according to claim 3, wherein the molding step comprises pressing or extruding of the MOF containing powder.

5. The process according to claim 1, wherein the shaped body additionally comprises a binder.

6. The process according to claim 1, wherein the surface area is determined by the BET method.

7. The process according to claim 1, wherein the ratio of the surface area per volume of the shaped body to the surface area per volume of the powder is at least 1.8:1.

8. The process according to claim 1, wherein the ratio of the surface area per volume of the shaped body to the surface area per volume of the powder is from 2.5:1 to 5:1 wherein the surface area is measured according to the BET method.

9. The process according to claim 1, wherein the step of converting forms a shaped body having length, width and depth dimensions of from 1 mm to 16 mm.

10. The process of claim 9, wherein the ratio of the surface area per volume of the shaped body to the surface area per volume of the powder after the converting step is at least 1.7:1.

11. The process according to claim 1, wherein the converting is carried out by first mixing the MOF containing powder with a liquid to form a moldable paste, then
molding the moldable paste into the form of the shaped body, then
drying the shaped body.

12. The process according to claim 1, wherein the converting is at least one of briquetting, granulating, pelletizing, and sintering.

13. The process according to claim 1, wherein the converting comprises pressing the MOF containing powder at a pressure up to 100 bar and a temperature up to 300° C.

14. The process according to claim 1, wherein the converting is carried out to form a shaped body having a crush strength of 13-50.5 N and a BET surface area of from 424 to 1270m²/g according to DIN 66131.

* * * * *